United States Patent Office 2,848,334
Patented Aug. 19, 1958

2,848,334

STABILIZED EGG AND MILK PRODUCT AND METHOD OF PREPARING SAME

Eynon Jones, Tigard, Oreg., assignor, by mesne assignments, to Chas. L. Nichols, as trustee, Beverly Hills, Calif.

No Drawing. Application March 29, 1955
Serial No. 497,798

2 Claims. (Cl. 99—113)

This invention relates to an egg and milk product which is stabilized in liquid form for use for many purposes where whole eggs are ordinarily used.

There is a problem in the poultry and egg distributing industry of disposing of eggs having cracked or defective shells at a price which will cover production costs. Various processes have heretofore been proposed for making powdered egg materials and also for freezing eggs, but such products have serious limitations and have not been generally accepted for home consumption. As a result of such limited marketability the eggs used in such products are greatly depreciated in value merely because of the lack of sufficiently strong and well-formed shells which have nothing to do with the quality of the edible portion of the eggs.

The general object of the present invention is, therefore, to provide a new and improved product and process for utilizing eggs with defective shells which cannot be sold in the usual manner in cartons and crates.

Another object is to provide a novel form of egg product for utilizing surplus eggs and for facilitating the handling and marketing of such eggs in an efficient and economical manner.

Another object is to provide a stable liquid egg product for general household cooking and baking purposes which may be kept for a reasonable time at a cool temperature.

Another object is to provide a product of the type described which is suitable for making palatable scrambled eggs, omelets and custards and which contains its own pan lubricant.

Another object is to provide a new and improved economical process involving homogenization and the addition of other substances for forming a stabilized liquid egg solution.

In order to explain a preferred manner of practicing the invention, a preferred formulation will be described, but it is to be understood that the invention is not to be limited with respect to ingredients, proportions and temperatures and other variables involved in the process except to the extent that such variables are specified and limited in the appended claims.

Preparatory to the introduction of the eggs, a primary mixture of milk or milk and cream is prepared to a butterfat content in the range between 1% to 25%, total weight basis. This mixture is warmed to pasteurizing temperature which may be 142½° F. for a batch type of pasteurizing process or 196° F. for a flash type pasteurizing process.

The mixture is pasteurized and then milk solids are added in an amount which may vary between 1% and 10% on a total weight basis, depending largely upon the amount of sweetening of the taste which may be tolerated. While the mixture is still at approximately the elevated temperature specified, 1% to 10% of butter is added, the butter being melted by the temperature of the liquid. This mixture is then homogenized in a conventional milk or cream homogenizing machine according to the usual practice in homogenizing milk or cream.

After homogenization, the primary mixture just described is cooled to a temperature in the range between 35° F. and 50° F. that will not coagulate egg whites and the eggs are prepared. The eggs are first beaten and broken up to thoroughly mix the yolks and whites without including a great amount of air. Thus beaten, the eggs are introduced to the cooled primary mixture preferably in the amount of 50% to 66% eggs, based on the weight of the total mixture. The egg content as above described may comprise as much as 97% of the total mixture, if desired. The egg and milk mixture is then homogenized in a conventional milk homogenizing machine which stabilizes the entire mixture and permits it to be bottled and kept at a cool temperature whereby it may be handled and sold in the same manner as pasteurized milk. There is no tendency for the different constituents to stratify or separate out of the liquid which remains homogeneous and usable for a considerable time after preparation.

The amount of butter recommended is sufficient to flavor and lubricate the material in a frying pan in the making of scrambled eggs and the like without any additional butter or grease being required in cooking. Additional fat or oil may be used in the cooking utensil, however, for the benefit of the flavor imparted thereby, when desired. The liquid material may also be used in place of carton eggs for the making of cakes and other general cooking purposes, as well as for uncooked preparations, such as eggnogs and the like.

A specific preferred table of ingredient proportions is as follows for a one hundred pound batch:

|  | Lbs. |
|---|---|
| Eggs | 60 |
| 10% butterfat milk and cream mixture | 32.5 |
| Milk solids | 5 |
| Butter | 2.5 |

Other ingredients may be included such as pre-cooked starches, gums, colloids, stabilizers such as sodium algenate and anti-oxidants such as oat flours. Butterfat substitutes may be used in place of butter, such as various vegetable and animal fats. Also, it is possible to make a stable liquid egg product with eggs alone wherein the eggs are merely beaten and then homogenized, but such a product lacks the flavor and other desirable properties imparted by the other ingredients. When no fats or solids are used the first homogenizing step is not necessary.

A conventional homogenizing machine as hereinabove referred to comprises a single, double, or triple stage apparatus wherein each stage comprises a cylinder having an orifice plate in its head with a plurality of minute orifices through which a liquid is forced by a piston under pressures ranging from 1000 pounds per square inch upwards. A double or triple stage machine has two or three such cylinders, respectively, through which the material is passed for successive treatments. The forcing of the liquid through the minute orifices under such high pressure breaks down the natural fat globules into smaller particles and changes their structure and nature so that they exhibit no tendency to reunite. Homogenization is, therefore, a distinct type of process or treatment which is recognized and understood in the art and is to be distinguished from ordinary beating or emulsification in other types of apparatus.

The foregoing process thus provides a novel liquid egg product which is acceptable to the housewife and far superior to frozen eggs and egg powder for domestic purposes. Its keeping qualities permit it to be kept in the household refrigerator along with carton eggs, milk, butter and other dairy products.

Having now described my invention and in what man- ner the same may be used, what I claim as new and desire to protect by Letters Patent is:

1. The process of stabilizing eggs for unfrozen refrigerated storage in bulk liquid form comprising preparing a mixture of milk and cream to a butterfat content in the range between 1% to 25%, pasteurizing said mixture, adding milk solids in an amount from 1% to 10% and butter in an amount from 1% to 10%, homogenizing said mixture, cooling the mixture, adding beaten eggs in an amount of 50% to 97% based on the weight of the entire mixture, and then homogenizing the resulting mixture.

2. A stabilized liquid egg product which may be kept under refrigeration in an unfrozen state comprising an homogenized mixture of beaten eggs in an amount of 50% to 97% with a primary preparation comprising an homogenized mixture of milk solids 1% to 10%, fat 1% to 10%, and the remainder milk and cream, all percentages based on the weight of the entire mixture.

References Cited in the file of this patent

UNITED STATES PATENTS

| | | |
|---|---|---|
| 762,277 | Campbell | June 14, 1904 |
| 1,374,138 | Coulson | Apr. 5, 1921 |
| 1,870,269 | Tressler | Aug. 9, 1932 |
| 1,891,887 | Clickner | Dec. 20, 1932 |
| 1,895,694 | Tranin et al. | Jan. 31, 1933 |
| 1,897,775 | Tranin | Feb. 14, 1933 |
| 2,115,730 | Lomax | May 3, 1938 |
| 2,142,510 | Harris et al. | Jan. 3, 1939 |
| 2,479,310 | Chapin | Aug. 16, 1949 |
| 2,520,954 | North et al. | Sept. 5, 1950 |

OTHER REFERENCES

"Culinary Arts Institute Encyclopedic Cook Book," 1948, by Ruth Beroezheimer, published by Culinary Arts Institute, Chicago, Illinois, page 290, article entitled Eggs in Pimento Cups.